US011982208B2

(12) United States Patent
Kilchyk et al.

(10) Patent No.: US 11,982,208 B2
(45) Date of Patent: May 14, 2024

(54) TWO-PIECE IMPELLER MADE OF MULTIPLE MATERIALS

(71) Applicant: Hamilton Sundstrand Corporation, Charlotte, NC (US)

(72) Inventors: Viktor Kilchyk, Lancaster, NY (US); Brent J. Merritt, Southwick, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/962,164

(22) Filed: Oct. 7, 2022

(65) Prior Publication Data

US 2024/0117745 A1 Apr. 11, 2024

(51) Int. Cl.

*F04D 29/28* (2006.01)
*F01D 5/28* (2006.01)
*F04D 17/10* (2006.01)
*F04D 29/02* (2006.01)

(52) U.S. Cl.

CPC ............. *F01D 5/282* (2013.01); *F04D 17/10* (2013.01); *F04D 29/023* (2013.01); *F04D 29/285* (2013.01); *F05D 2220/30* (2013.01); *F05D 2300/603* (2013.01)

(58) Field of Classification Search

CPC ..... F04D 29/023; F05D 2220/30; F01D 5/282
USPC ...................................................... 416/241 R
See application file for complete search history.

(56) References Cited

U.S. PATENT DOCUMENTS 3,582,232 A * 6/1971 Okapuu .................. F01D 5/046 416/97 R
4,125,344 A * 11/1978 Tiefenbacher .......... F01D 5/045 416/214 A
7,938,627 B2 * 5/2011 Muller .................. F04D 29/023 416/198 A
8,794,914 B2 * 8/2014 Hommes ............... F04D 29/284 415/206
8,920,128 B2 * 12/2014 Matwey ................ F04D 29/284 60/785
8,998,581 B2 4/2015 Giovannetti et al.
9,726,022 B2 * 8/2017 Mittendorf ................ F01D 5/18
9,797,255 B2 10/2017 Baehmann et al.
2013/0004316 A1 1/2013 Matwey et al.
2016/0083552 A1 3/2016 Nosker et al.
2016/0186585 A1 6/2016 Beers et al.
2017/0254209 A1 9/2017 Smoke et al.
2020/0032810 A1 1/2020 Konno

FOREIGN PATENT DOCUMENTS

JP S59103999 A 6/1984

OTHER PUBLICATIONS

Extended European Search Report for EP Application No. 23200183.4, dated Feb. 20, 2024, 10 pages.

* cited by examiner

*Primary Examiner* — Michael L Sehn
(74) *Attorney, Agent, or Firm* — Kinney & Lange, P.A.

(57) ABSTRACT

An impeller includes a metallic inducer portion and a polymeric exducer portion connected to the metallic inducer portion. The metallic inducer portion includes an inducer hub, inducer blades attached to the inducer hub, and an inducer coupling on an end of the inducer hub. The polymeric exducer portion includes an exducer hub, exducer blades attached to the exducer hub, and an exducer coupling on an end of the exducer hub. The exducer coupling connects to the inducer coupling.

17 Claims, 4 Drawing Sheets

TWO-PIECE IMPELLER MADE OF MULTIPLE MATERIALS

BACKGROUND

This disclosure relates to impellers for rotary machines and, more specifically, impellers that are made of two different materials.

Rotary machines, like compressors, turbines, and blowers, include impellers which spin at high rates when the rotary machine is in operation. Impellers are typically made of aluminum or other metals to resist centrifugal forces deforming the impellers. Metal is also used because impellers are exposed to high heat when rotary machines are in operation. However, metal impellers are heavy and require heavy containment (metal reinforcement in a shroud partially surrounding an impeller). Containment is necessary to keep broken pieces of impeller from penetrating the walls of the rotary machine and other structures surrounding the rotary machine. Heavy impellers and shrouds are not well suited to use in aerospace because the added weight reduces an aircraft's fuel efficiency.

Plastic and fiber-reinforced plastic can withstand operating temperatures in many rotary machines. These polymers have temperature operating ranges between −190° C. and 200° C. The temperature range of rotary machines is often within the temperature operating range of polymers. Polymers and fiber-reinforced plastics are lighter than aluminum while still retaining strength necessary for components.

SUMMARY

An impeller includes a metallic inducer portion and a polymeric exducer portion connected to the metallic inducer portion. The metallic inducer portion includes an inducer hub, inducer blades attached to the inducer hub, and an inducer coupling on an end of the inducer hub. The polymeric exducer portion includes an exducer hub, exducer blades attached to the exducer hub, and an exducer coupling on an end of the exducer hub. The exducer coupling connects to the inducer coupling.

A rotary machine includes a compressor section, a first turbine section, and a tie rod. The compressor section includes a compressor housing with a compressor inlet and a compressor outlet, a compressor duct connecting the compressor inlet and the compressor outlet, and a compressor impeller in the compressor duct. The first turbine section includes a first turbine housing with a first turbine inlet and a first turbine outlet, a first turbine duct connecting the first turbine inlet and the first turbine outlet, and a first turbine impeller in the first turbine duct. The first turbine impeller includes a first metallic inducer portion and a first polymeric exducer portion connected to the first metallic inducer portion. The first metallic inducer portion includes a first inducer hub, first inducer blades attached to the first inducer hub, and a first inducer coupling on an end of the first inducer hub. The first polymeric exducer portion includes a first exducer hub, first exducer blades attached to the first exducer hub, and a first exducer coupling on an end of the first polymeric exducer hub. The first exducer coupling connects to the first inducer coupling.

DETAILED DESCRIPTION

Figure 1:
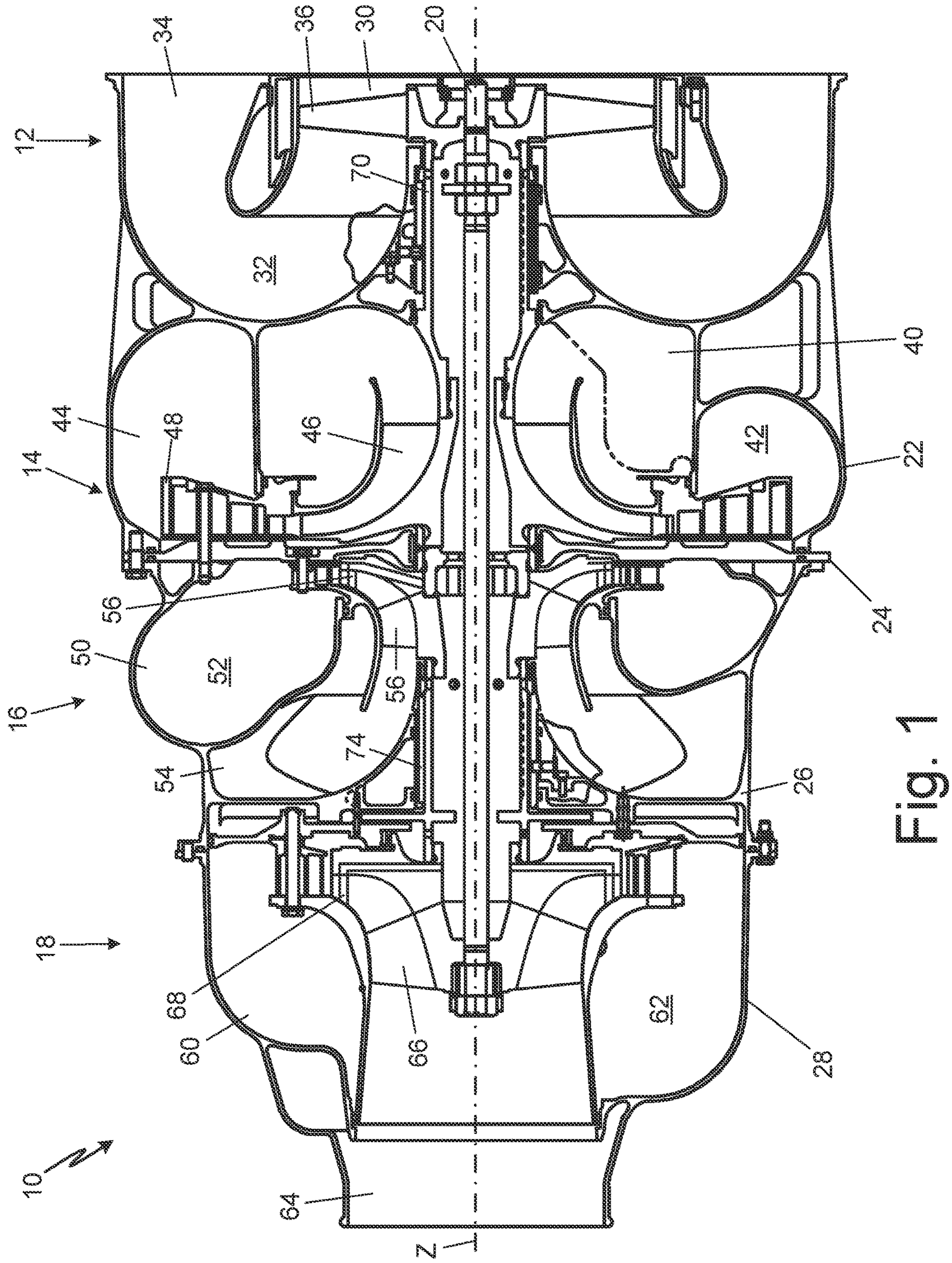
FIG. 1 is a cross-sectional view of an air cycle machine.

FIG. 1 is a cross-sectional view of air cycle machine 10, which includes fan section 12, compressor section 14, first turbine section 16, second turbine section 18, tie rod 20, fan and compressor housing 22, seal plate 24, first turbine housing 26, and second turbine housing 28. Also shown in FIG. 1 is axis Z.

Fan section 12, compressor section 14, first turbine section 16, and second turbine section 18 are all mounted on tie rod 20. Tie rod 20 rotates about axis Z. Fan and compressor housing 22 is connected to seal plate 24 and first turbine housing 26 with fasteners. Seal plate 24 separates flow paths in fan and compressor housing 22 from flow paths in first turbine housing 26. First turbine housing 26 is connected to second turbine housing 28 with fasteners. Fan and compressor housing 22, first turbine housing 26, and second turbine housing 28 together form an overall housing for air cycle machine 10. Fan and compressor housing 22 houses fan section 12 and compressor section 14. First turbine housing 26 houses first turbine section 16. Second turbine housing 28 houses second turbine section 18.

Fan section 12 includes fan inlet 30, fan duct 32, fan outlet 34, and fan rotor 36. Fan section 12 typically draws in ram air from a ram air scoop or alternatively from an associated gas turbine or other aircraft component. Air is drawn into fan inlet 30 and is ducted through fan duct 32 to fan outlet 34. Fan rotor 36 is positioned in fan duct 32 adjacent to fan inlet 30 and is mounted to and rotates with tie rod 20. Fan rotor 36 draws air into fan section 12 to be routed through air cycle machine 10.

Compressor section 14 includes compressor inlet 40, compressor duct 42, compressor outlet 44, compressor impeller 46, and diffuser 48. Air is routed into compressor inlet 40 and is ducted through compressor duct 42 to compressor outlet 44. Compressor impeller 46 and diffuser 48 are positioned in compressor duct 42. Compressor impeller 46 is mounted to and rotates with tie rod 20 to compress the air flowing through compressor duct 42. Diffuser 48 is a static structure through which the compressor air can flow after it has been compressed with compressor impeller 46. Air exiting diffuser 48 can then exit compressor duct 42 through compressor outlet 44.

First turbine section 16 includes first turbine inlet 50, first turbine duct 52, first turbine outlet 54, and first turbine impeller 56. Air is routed into first turbine inlet 50 and is ducted through first turbine duct 52 to first turbine outlet 54. First turbine impeller 56 is positioned in first turbine duct 52 and is mounted to and rotates with tie rod 20. First turbine impeller 56 will extract energy from the air passing through first turbine section 16 to drive rotation of tie rod 20.

Second turbine section 18 includes second turbine inlet 60, second turbine duct 62, second turbine outlet 64, second turbine impeller 66, and second turbine cooling channels 68. Air is routed into second turbine inlet 60 and is ducted through second turbine duct 62 to second turbine outlet 64. Second turbine impeller 66 is positioned in second turbine duct 62 and is mounted to and rotates with tie rod 20. Second turbine impeller 66 will extract energy from the air passing through second turbine section 18 to drive rotation of tie rod 20. Second turbine cooling channels 68 directs air through blades and a hub of second turbine impeller 66 toward a bearing cooling flow path.

Air cycle machine 10 further includes first journal bearing 70 and second journal bearing 74. First journal bearing 70 is positioned in fan section 12 and is supported by fan and compressor housing 22. First journal bearing 70 supports a first rotating shaft. Second journal bearing 74 is positioned in first turbine section 16 and is supported by first turbine housing 26. Second journal bearing supports a second rotating shaft.

Figure 2:
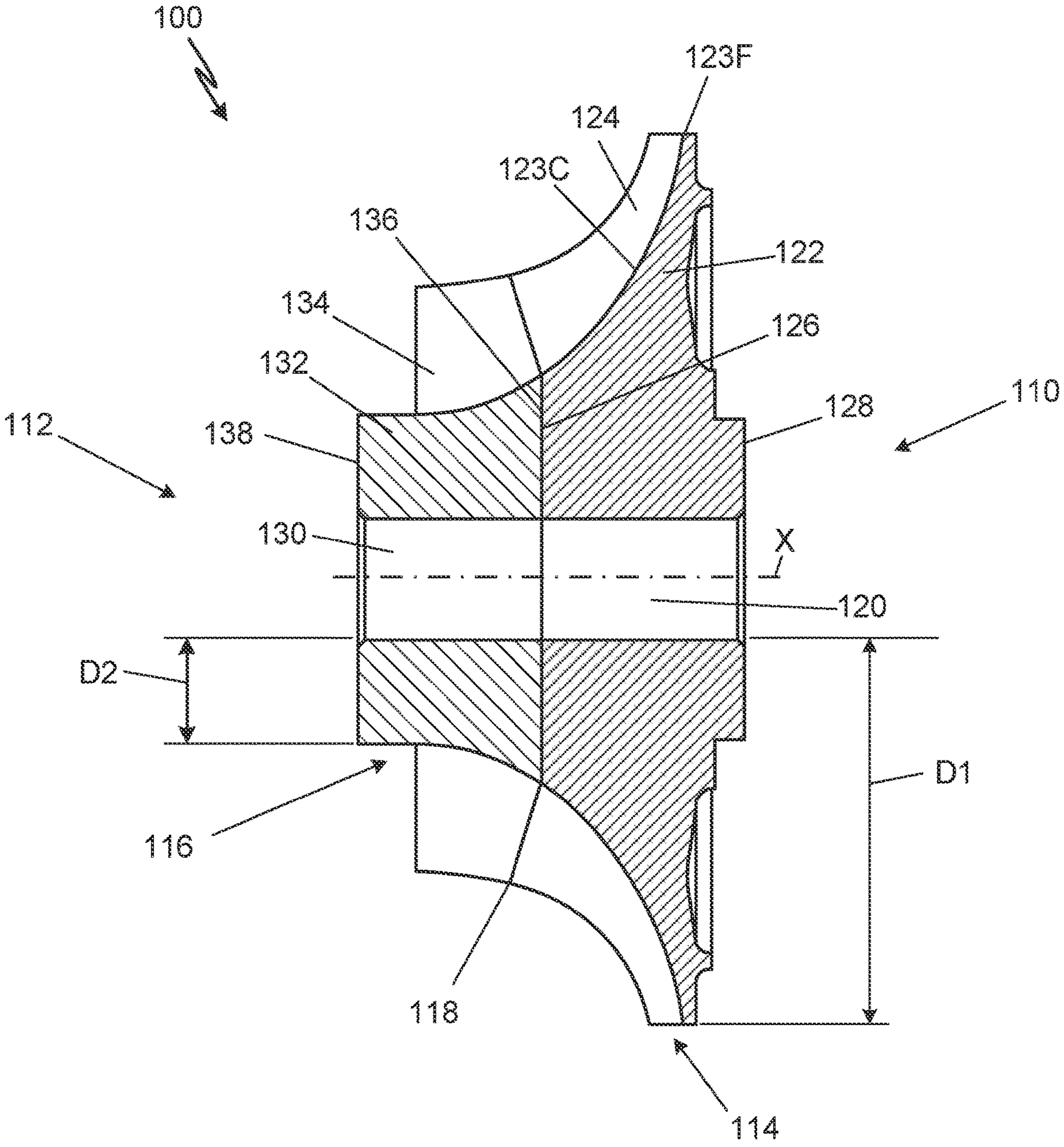
FIG. 2 is a cross-sectional view of a first embodiment of a turbine impeller in the air cycle machine.

FIG. 2 is a cross-sectional view of turbine impeller 100. Impeller 100 includes inducer portion 110, exducer portion 112, upstream portion 114, downstream portion 116, and joint 118. Inducer portion 114 includes inducer bore 120, inducer hub 122, inducer blades 124, inducer coupling 126, and inducer open end 128. Exducer portion 112 includes exducer bore 130, exducer hub 132, exducer blades 134, exducer coupling 136, and exducer open end 138. FIG. 2 also shows axis X, dimension D1, and dimension D2

Impeller 100 is a turbine impeller and could be first turbine impeller 56 or second turbine impeller 66 in air cycle machine 10 (shown in FIG. 1). Impeller 100 is coaxial and rotates around axis X. When impeller 100 is assembled, as shown in FIG. 2, inducer portion 110 is at a first side of impeller 100 and exducer portion 112 is at a second side. Inducer portion 110 has upstream portion 114, which is located at a radially outer portion of impeller 100. Exducer portion 112 has downstream portion 116, which is located at the second side of impeller 100. Joint 118 is formed at a connection point between inducer portion 110 and exducer portion 112.

Inducer portion 110 includes inducer bore 120, inducer hub 122 with flat portion 123F and curved portion 123C, inducer blades 124, inducer coupling 126, inducer open end 128, and dimension D1. Inducer bore 120 is coaxial with axis X. Inducer bore 120 is within inducer hub 122. Inducer hub 122 extends to radially to upstream portion 114. A radially outer surface of inducer hub 122 has flat portion 123F at upstream portion 114. Flat portion 123F is generally parallel to axis X and inducer bore 120. Curved portion 123C of the radially outer surface of inducer hub 122 extends from flat portion 123F to joint 118. Blades 124 attach to curved portion 123C of the radially outer surface of inducer hub 122. Inducer coupling 126 is adjacent to exducer portion 112 and helps create joint 118. Inducer open end 128 is axially away from inducer coupling 126 and is near the first side of impeller 100. Dimension D1 is a distance between inducer bore 120 and flat portion 123F of the radially outer surface of inducer hub 122.

Exducer portion 112 includes exducer bore 130, exducer hub 132, exducer blades 134, exducer coupling 136, exducer open end 138 and dimension D2. Exducer bore 130 is coaxial with axis X. Exducer bore 130 aligns with inducer bore 120 when impeller 100 is assembled. Exducer bore 130 is within exducer hub 132. A radially outer surface of exducer hub 132 is curved. Blades 134 attach to a portion of the radially outer surface of exducer hub 132. Exducer coupling 136 is adjacent to and couples with inducer coupling 126 at inducer 110. Inducer coupling 136 and exducer coupling 126 combine to create joint 118. Exducer open end 138 is axially away from exducer coupling 136 and is near the second side of impeller 100. Dimension D2 is a distance between exducer bore 130 and the radially outer surface of exducer hub 132. Dimension D2 is less than dimension D1 because impeller 100 is for a turbine.

Inducer 110 connects to exducer 112 at joint 118 when inducer coupling 126 and exducer coupling 136 are connected. Inducer coupling 126 and exducer coupling 136 can connect through any reasonable method. In one embodiment, inducer coupling 126 and exducer coupling 136 connect by brazing. For example, inducer coupling 126 and exducer coupling 136 are soldered together such that inducer bore 120 aligns with exducer bore 130 and inducer blades 124 align with exducer blades 134. In a second embodiment, inducer coupling 126 and exducer coupling 136 are connected by adhesive instead of brazing.

In a third embodiment, inducer coupling 126 and exducer coupling 136 are threaded components that screw together. For example, inducer coupling 126 could include a lip that has threads on a radially outer surface and exducer coupling 136 could include a lip that has threads on a radially inner surface. The threaded lip of inducer coupling 126 screws onto with the threaded lip of exducer coupling 136 such that inducer bore 120 aligns with exducer bore 130 and inducer blades 124 align with exducer blades 134.

In a fourth embodiment, inducer 110 connects to exducer 112 by being secured to a tie rod (for example, tie rod 20 shown in FIG. 1). For example, inducer portion 110 can be placed onto the tie rod by slipping inducer bore 120 over the tie rod. Then, exducer portion 112 can be placed onto the tie rod adjacent to the inducer portion 110 such that inducer coupling 126 and exducer coupling 136 connect. Inducer portion 110 and exducer portion 112 can be aligned such that inducer blades 124 align with exducer blades 136. Then, inducer portion 110 and exducer portion 112 can be secured together and onto the tie rod with a fastener (for example, see FIG. 1).

In a fifth embodiment, any combination of brazing, adhering, screwing together, and securing with a fastener can be used to attach inducer portion 110 to exducer portion 112.

Inducer portion 110 and exducer portion 112 can be made of different materials to help reduce weight and/or reinforce portions of impeller 100. Inducer portion 110 is a metallic inducer and is made of a metal or a metal alloy, for example, aluminum. Inducer portion 110 can be manufactured using casting, machining, milling, welding, and/or additive manufacturing. Exducer portion 112 is a polymeric exducer portion and is made of a polymer including plastics and fiber-reinforced plastics. Polymers can include para-amid fibers (Kevlar), carbon fibers, nylon fibers, micro-carbon-fiber-filled nylon material (Onyx™), and combinations thereof. Exducer portion 112 can be additively manufactured or molded. Choosing the proper polymer for exducer 112 depends on the melting temperature of the polymer and the operating temperature of the turbine using impeller 100. The melting temperature of the polymer should be higher than the operating temperature of the turbine.

Impeller 100 operates like first turbine impeller 56 and second turbine impeller 66 in air cycle machine 10, shown in FIG. 1. Fluid enters impeller 100 through upstream portion 114 in inducer portion 110. Fluid expands through and rotates impeller 100 then exits through downstream portion 116 in exducer portion 112. Inducer bore 120 and exducer bore 130 allow impeller 100 to be mounted onto a tie rod, for example tie rod 20 (shown in FIG. 1). Impeller 100 is a turbine impeller, so fluid entering inducer portion 110 is warmer and at a higher pressure than fluid exiting exducer portion 112. Impeller 100 causes fluid expansion and cooling.

Fluid entering inducer portion 110 may be carrying debris or grit, which can scratch and degrade inducer portion 110. Using a metal or metal alloy reduces the degradative effects of debris or grit entering impeller 100. Fluid entering inducer portion 110 is also relatively warmer than fluid exiting impeller 100. The metal or metal alloy used for inducer portion 110 is unlikely to melt when contacting the relatively warmer fluid.

Fluid moving through exducer portion 112 is cooler than fluid entering and moving through inducer portion 110. As such, a plastic and/or a fiber-reinforced plastic with a lower melting point than metal (but a higher melting point than the operating temperature of the turbine) can be used. Using a polymer reduces the weight of impeller 100 compared to an impeller made entirely of metal or metal alloy. Reduced weight reduces the overall weight of a turbine utilizing impeller 100. Further, less containment is necessary to protect the turbine from flying impeller parts if impeller 100 breaks during operation. Reducing the weight of impeller 100 and the low probability that the polymer used for exducer portion 112 would breach a containment structure (for example, a turbine shroud) results in less containment being necessary. Reducing containment also lowers the weight of a turbine with impeller 100 and reduces construction costs for the turbine.

Fiber reinforcement also stabilizes impeller geometry during rotary machine operation. Using fiber-reinforced plastic for exducer portion 112 reduces exducer blades 134 from deflection due to centrifugal force while impeller 100 rotates. A more stable impeller geometry creates less clearance variation between exducer blades 134 and a shroud that partially surrounds impeller 100 in a turbine. This allows a turbine design with less clearance between a shroud and impeller 100, increasing the reliability and efficiency of the turbine and reducing operation cost.

Figure 3:
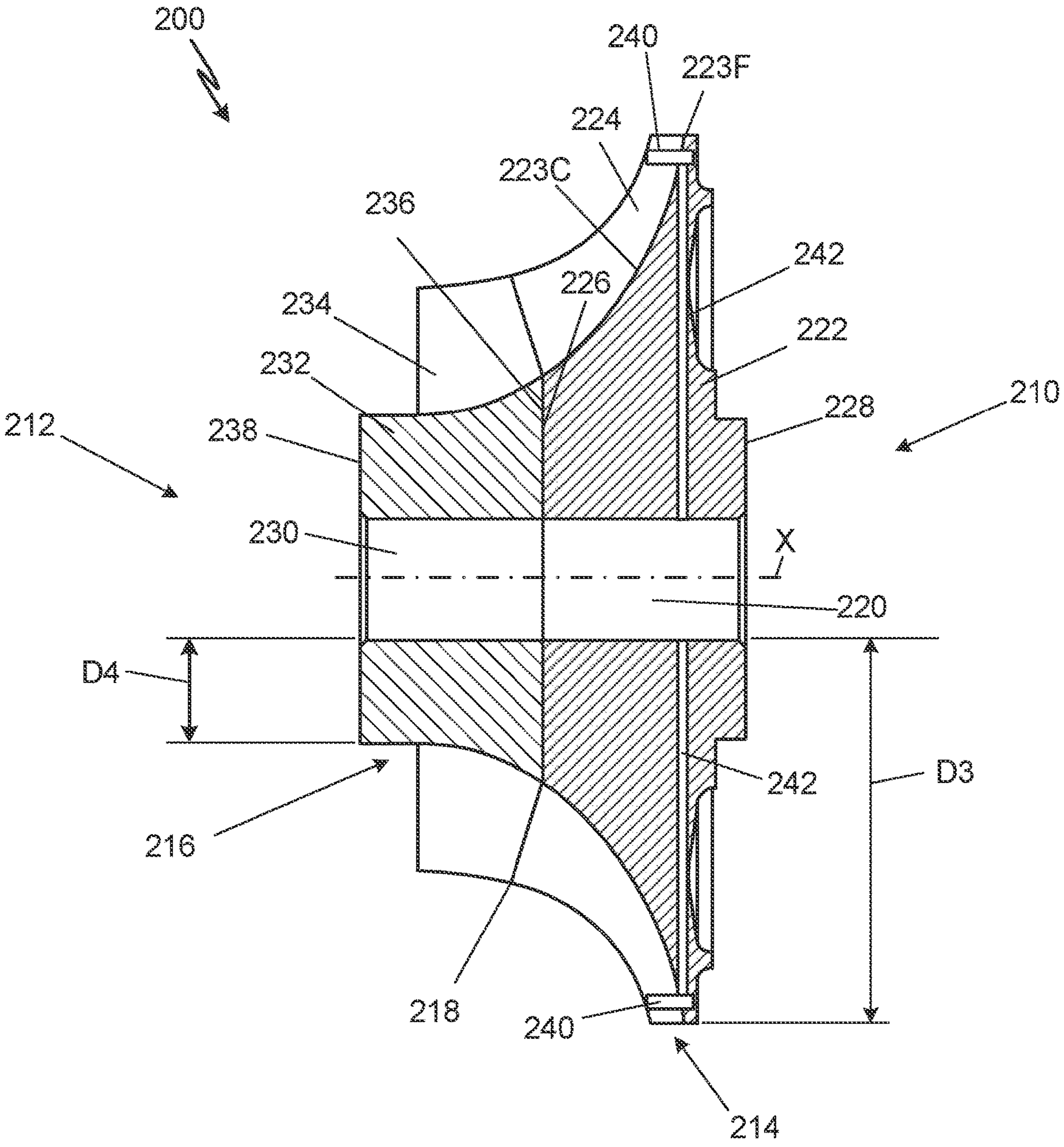
FIG. 3 is a cross-sectional view of a second embodiment of a turbine impeller.

FIG. 3 is a cross-sectional view of turbine impeller 200. Impeller 200 includes inducer portion 210, exducer portion 212, upstream portion 214, downstream portion 216, and joint 218. Inducer portion 214 includes inducer bore 220, inducer hub 222 with flat portion 223F and curved portion 223C, inducer blades 224, inducer coupling 226, and inducer open end 228. Exducer portion includes exducer bore 230, exducer hub 232, exducer blades 234, exducer coupling 236, and exducer open end 238. FIG. 3 also shows axis X, dimension D3, and dimension D4. Impeller 200 also includes channel inlets 240 and cooling channels 242.

Impeller 200 has a structure and functions like impeller 100 (shown in FIG. 2) with respect to inducer portion 210, exducer portion 212, upstream portion 214, downstream portion 216, joint 218, inducer bore 220, inducer hub 222, flat portion 223F, curved portion 223C, inducer blades 224, inducer coupling 226, inducer open end 228, exducer bore 230, exducer hub 232, exducer blades 234, exducer coupling 236, and exducer open end 238. Components with similar structures and functions in FIG. 2 have been numbered with an increase of 100 in FIG. 3. Impeller 200 also includes channel inlets 240 and channels 242 to provide air to bearings (for example, first journal bearing 70 and second journal bearing 74 shown in FIG. 1). Impeller 200 can be used in a turbine, for example first turbine section 14 or second turbine section 16 as shown in FIG. 1.

FIG. 3 shows dimension D3 and dimension D4. Dimension D3 is a distance between inducer bore 220 and flat portion 223F of a radially outer surface of inducer hub 222. Distance D4 is between exducer hub 230 and a radially outer surface of hub 232. Dimension D3 is larger than dimension D4 because impeller 200 is for a turbine.

Impeller 200 also includes channel inlets 240 and channels 242. Channel inlets 240 are in inducer blades 224. Channel inlets 240 can be shaped like slots, holes, rows of holes, or porous portions in tips of inducer blades 224. Channels 242 connect channel inlets 240 with inducer hub 220. Channel inlets 240 reduce flow separation caused by fluid moving around the tips of inducer blades 224, which increases the operating efficiency of a turbine using impeller 200. Channel inlets 240 and channels 242 allow for cooling air flow to move through inducer hub 222 and into inducer bore 220 and around journal bearings (for example, first journal bearing 70 and second journal bearing 74 shown in FIG. 1) in a rotary machine.

Impeller 200 can also be made of multiple materials. Inducer portion 210 is a metallic inducer portion and is made of metal and metal alloys including aluminum. As discussed in relation to impeller 100, making inducer portion 210 from metal reduces degradation from debris and grit carried into impeller 100 by fluid moving through a turbine utilizing impeller 200.

Exducer portion 212 is a polymeric exducer portion and is made of a polymer, for example para-amid fibers (Kevlar), carbon fibers, nylon fibers, micro-carbon-fiber-filled nylon material (Onyx™), and combinations thereof. Making exducer portion 212 from a polymer reduces the weight of impeller 200, thereby reducing the amount of containment needed for impeller 200 and the weight of a turbine using impeller 200. Using a polymer for exducer portion 212 also stabilizes the geometry of impeller 200 while rotating in a turbine allowing a lower clearance variation between impeller 200 and a partially surrounding shroud. This increases turbine reliability and efficiency. A lighter impeller 200 reduces manufacturing and operating costs of a turbine using impeller 200.

Figure 4:
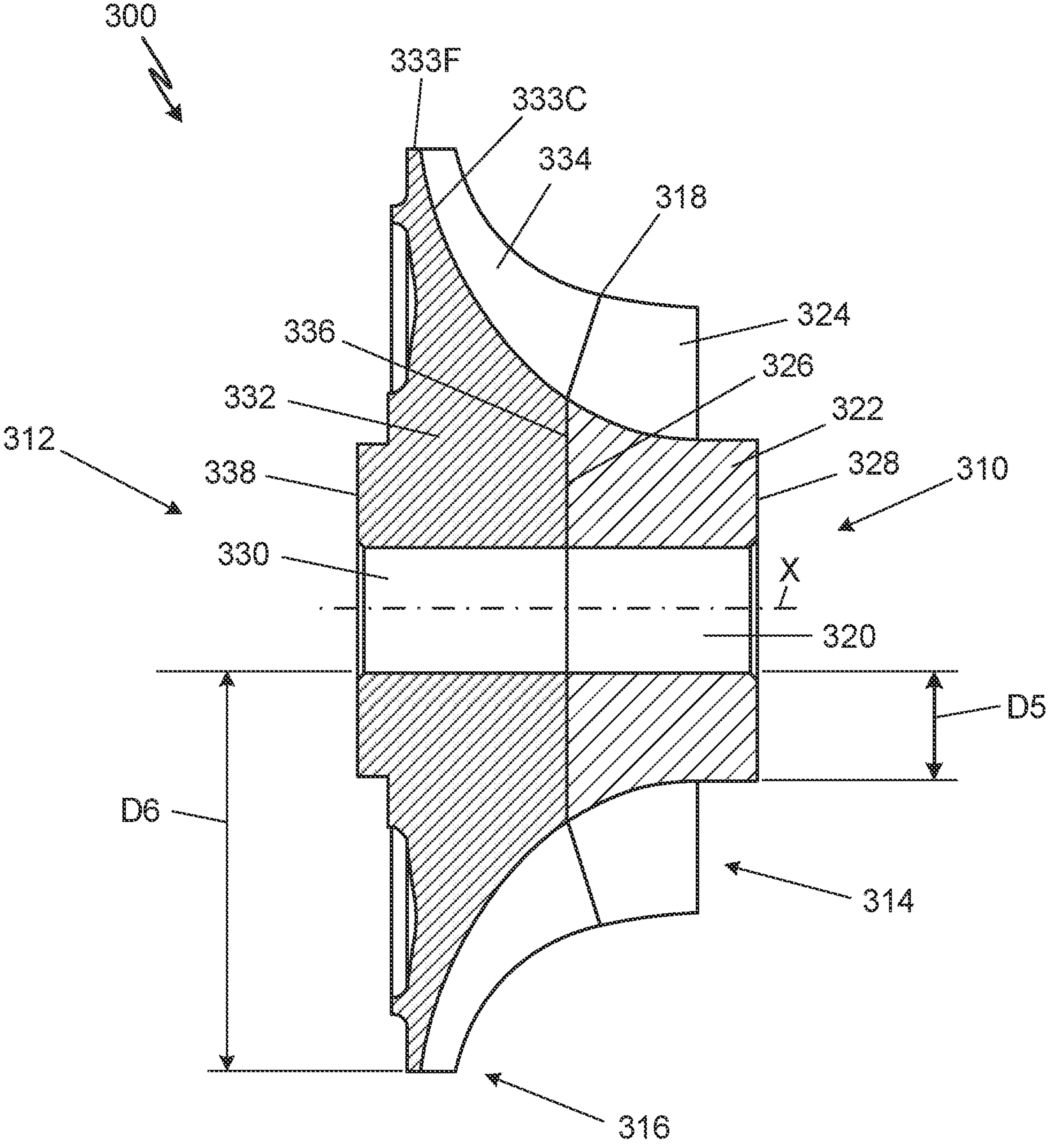
FIG. 4 is a cross-sectional view of a two-piece compressor impeller.

FIG. 4 is a cross-sectional view of compressor impeller 300. Impeller 300 includes inducer portion 310, exducer portion 312, upstream portion 314, downstream portion 316, and joint 318. Inducer portion 310 includes inducer bore 320, inducer hub 322, inducer blades 324, inducer coupling 326, and inducer open end 328. Exducer portion 312 includes exducer bore 330, exducer hub 332 with curved portion 333C and flat portion 333F, exducer blades 334, exducer coupling 336, and exducer open end 338. FIG. 4 also shows axis X, dimension D5, and dimension D6. Impeller 300 is assembled in FIG. 4.

Impeller 300 is a compressor impeller that can be used in a compressor (for example, compressor section 14 shown in FIG. 1). Impeller 300 is coaxial with and rotates around axis X. Inducer portion 310 is at a first side of impeller 300 and exducer portion 312 is at a second side. Inducer portion 310 has upstream portion 314, which is located at the second side of impeller 300. Exducer portion 312 has downstream portion 316, which is located at a radially outer portion of impeller 300. Joint 318 is formed at a connection point between inducer portion 310 and exducer portion 312.

Inducer portion 310 includes inducer bore 320, inducer hub 322, inducer blades 324, inducer coupling 326, inducer open end 328, and dimension D5. Inducer bore 320 is coaxial with axis X. Inducer bore 320 is within inducer hub 322. A radially outer surface of inducer hub 322 is curved. Inducer blades 334 attach to the radially outer surface of inducer hub 322. Inducer coupling 326 is adjacent to exducer portion 312 and helps create joint 318. Inducer open end 328 is axially away from inducer coupling 326 and is near the first side of impeller 300. Dimension D5 is a distance between inducer bore 320 and the radially outer surface of inducer hub 322.

Exducer portion 312 includes exducer bore 330, exducer hub 332 with flat portion 333F and curved portion 333C, exducer blades 334, exducer coupling 336, exducer open end 338, and dimension D6. Exducer bore 330 is coaxial with axis X. Exducer bore 330 is within exducer hub 332. Exducer hub 332 extends to radially to downstream portion 316. A radially outer surface of exducer hub 332 has flat portion 333F at downstream portion 316 and curved portion 333C between joint 318 and flat portion 333F. Flat portion 333F is generally parallel to axis X and exducer bore 330. Blades 334 attach to curved portion 333C of the radially outer portion of exducer hub 332. Exducer coupling 336 is adjacent to and couples with inducer coupling 326. Exducer coupling 336 and inducer coupling 326 combine to create joint 318. Exducer bore 330 aligns with inducer bore 320 when impeller 300 is assembled. Exducer open end 338 is axially away from exducer coupling 336 and is near the second side of impeller 300. Dimension D6 is a distance between exducer bore 330 and flat portion 333F of the radially outer surface of exducer hub 332. Dimension D5 is smaller than dimension D6 because impeller 100 is for a compressor.

Inducer portion 310 and exducer portion 312 can be connected at joint 318 through any method described in relation to impeller 100 in FIG. 1. These methods include brazing, using adhesive, screwing inducer portion 310 to exducer portion 312 together (requires inducer portion 310 and exducer portion 312 to be threaded), and/or securing inducer portion 310 and exducer portion 312 together using a shaft or a tie rod (for example, tie rod 20 in FIG. 1) and a fastener.

Impeller 300 is made of multiple materials. Inducer portion 310 is a metallic inducer portion and is made of a metal or a metal alloy, like aluminum. Exducer portion 312 is a polymeric exducer portion and is made of a polymer. For example, a plastic or a fiber-reinforced plastic. Example polymers exducer portion 312 can be made of include para-amid fibers (Kevlar), carbon fibers, nylon fibers, micro-carbon-fiber-filled nylon material (Onyx™), and combinations thereof. Operating temperature of the compressor utilizing impeller 300 should be considered when choosing the polymer for exducer portion 312. The polymer should have a higher melting point than the operating temperature of the compressor.

Fluid enters impeller 300 from upstream portion 300 and moves through inducer portion 310 to exducer portion 312 before exiting impeller 300 at downstream portion 316. Impeller 300 is spinning as the fluid moves through impeller 300. Inducer blades 324 and exducer blades 334 spin the fluid and increase the angular velocity of the fluid. As the fluid exits impeller 300, the fluid slows and compresses.

Using multiple materials to make impeller 300 has similar benefits to those discussed in relation to impeller 200. Using metal to make inducer portion 310 reduces degradation of inducer portion 310 caused by debris and grit in the fluid moving through impeller 300. Using a polymer to make exducer portion 312 reduces the weight of impeller 300, and therefore the weight of containment necessary for impeller 300 and the overall weight of the compressor using impeller 300. Using a fiber-reinforced polymer stabilizes impeller geometry while impeller 300 is in use allowing for a lower clearance between a compressor shroud partially surrounding impeller 300. This increases reliability and efficiency of a compressor using impeller 300 and reduces operating costs.

Discussion of Possible Embodiments

The following are non-exclusive descriptions of possible embodiments of the present invention.

An impeller includes a metallic inducer portion and a polymeric exducer portion connected to the metallic inducer portion. The metallic inducer portion includes an inducer hub, inducer blades attached to the inducer hub, and an inducer coupling on an end of the inducer hub. The polymeric exducer portion includes an exducer hub, exducer blades attached to the exducer hub, and an exducer coupling on an end of the exducer hub. The exducer coupling connects to the inducer coupling.

The impeller of the preceding paragraph can optionally include, additionally and/or alternatively, any one or more of the following features, configurations and/or additional components:

A further embodiment of the foregoing impeller, wherein a polymer for the polymeric exducer portion is chosen from the group consisting of para-aramid fiber, aramid fiber, carbon fiber, nylon, micro-carbon-fiber-filled nylon, and combinations thereof.

A further embodiment of any of the foregoing impellers, wherein a metal for the metallic inducer portion is aluminum.

A further embodiment of any of the foregoing impellers, wherein the inducer coupling is threaded, and wherein the exducer coupling is threaded to mate with the inducer coupling.

A further embodiment of any of the foregoing impellers, wherein the inducer coupling is brazed to the exducer coupling.

A further embodiment of any of the foregoing impellers, wherein the inducer coupling is adhered to the exducer coupling.

A further embodiment of any of the foregoing impellers, wherein the impeller further includes an open end of the inducer hub axially away from the inducer coupling and an inducer bore through the inducer hub. The impeller also includes an open end of the exducer hub axially away from the inducer coupling and an exducer bore through the inducer hub.

A further embodiment of any of the foregoing impellers, wherein a first distance is between the inducer bore and a radially outer surface of the metallic inducer portion and a second distance is between the exducer bore and a radially outer surface of the polymeric exducer portion. The first distance is larger than the second distance.

A further embodiment of any of the foregoing impellers, wherein a first distance is between the inducer bore and a radially outer surface of the metallic inducer portion and a second distance is between the exducer bore and a radially outer surface of the polymeric exducer portion. The first distance is smaller than the second distance.

A further embodiment of any of the foregoing impellers, and further including cooling openings in the inducer blades and cooling channels through the inducer blades and the inducer hub.

A rotary machine includes a compressor section, a first turbine section, and a tie rod. The compressor section includes a compressor housing with a compressor inlet and a compressor outlet, a compressor duct connecting the compressor inlet and the compressor outlet, and a compressor impeller in the compressor duct. The first turbine section includes a first turbine housing with a first turbine inlet and a first turbine outlet, a first turbine duct connecting the first turbine inlet and the first turbine outlet, and a first turbine impeller in the first turbine duct. The first turbine impeller includes a first metallic inducer portion and a first polymeric exducer portion connected to the first metallic inducer portion. The first metallic inducer portion includes a first inducer hub, first inducer blades attached to the first inducer hub, and a first inducer coupling on an end of the first inducer hub. The first polymeric exducer portion includes a first exducer hub, first exducer blades attached to the first exducer hub, and a first exducer coupling on an end of the first polymeric exducer hub. The first exducer coupling connects to the first inducer coupling.

The rotary machine of the preceding paragraph can optionally include, additionally and/or alternatively, any one or more of the following features, configurations and/or additional components:

A further embodiment of the foregoing rotary machine, wherein a polymer for the polymeric exducer portion is chosen from the group consisting of para-aramid fiber, aramid fiber, carbon fiber, nylon, micro-carbon-fiber-filled nylon, and combinations thereof.

A further embodiment of any of the foregoing rotary machines, wherein a metal for the metallic inducer portion is aluminum.

A further embodiment of any of the foregoing rotary machines, wherein the first turbine impeller inducer coupling is threaded and the first turbine impeller exducer coupling is threaded to mate with the first turbine impeller inducer coupling.

A further embodiment of any of the foregoing rotary machines, and further including a first nut on the tie rod holding the first turbine inducer coupling and the first turbine exducer coupling together.

A further embodiment of any of the foregoing rotary machines, wherein the first turbine inducer is brazed and/or adhered to the first turbine exducer coupling.

A further embodiment of any of the foregoing rotary machines, wherein the first turbine impeller further includes an inducer bore through the inducer hub and an exducer bore through the exducer hub. The inducer bore and the exducer bore align when the inducer coupling and the exducer coupling connect. The tie rod runs through the inducer bore and the exducer bore.

A further embodiment of any of the foregoing rotary machines, and further including a second turbine section. The second turbine section includes a second turbine housing with a second turbine inlet and a second turbine outlet, a second turbine duct connecting the second turbine inlet and the second turbine outlet, and a second turbine impeller in the second turbine duct and connected to the tie rod. The second turbine impeller includes a second metallic inducer portion and a second polymeric exducer portion. The second metallic inducer portion includes a second inducer hub, second inducer blades attached to the second inducer hub, and a second inducer coupling at an end of the second inducer hub. The second polymeric exducer portion connects to the second metallic inducer portion. The second polymeric exducer portion includes a second exducer hub, second exducer blades attached to the second exducer hub, and a second exducer coupling at an end of the second exducer hub. The second exducer coupling connects to the second inducer coupling.

A further embodiment of any of the foregoing rotary machines, wherein the first turbine impeller further includes cooling openings in the first turbine inducer blades and cooling channels through the first turbine inducer blades and the first turbine inducer hub. The second turbine impeller includes cooling openings in the second turbine inducer blades, and cooling channels through the second turbine inducer blades and the second turbine inducer hub. Air moves through the cooling openings and the cooling channels to cool bearings in the rotary machine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An impeller comprising:
- a metallic inducer portion comprising:
  - an inducer hub having an open end;
  - an inducer bore through the inducer hub;
  - inducer blades attached to the inducer hub;
  - an inducer coupling on an end of the inducer hub opposite the open end of the inducer hub; and
  - channels extending through the inducer blades and the inducer hub, wherein the channels fluidly connect channel inlets in tips of the inducer blades with the inducer bore; and
- a polymeric exducer portion connected to the metallic inducer portion, the polymeric exducer portion comprising:
  - an exducer hub;
  - exducer blades attached to the exducer hub; and
  - an exducer coupling on an end of the exducer hub;
  - wherein the exducer coupling connects to the inducer coupling; and
  - wherein a polymer for the polymeric exducer portion is chosen from the group consisting of para-aramid fiber, aramid fiber, and combinations thereof.

2. The impeller of claim 1, wherein a metal for the metallic inducer portion is aluminum.

3. The impeller of claim 1, wherein the inducer coupling is threaded, and wherein the exducer coupling is threaded to mate with the inducer coupling.

4. The impeller of claim 1, wherein the inducer coupling is brazed to the exducer coupling.

5. The impeller of claim 1, wherein the inducer coupling is adhered to the exducer coupling.

6. The impeller of claim 1, wherein a first distance is between the inducer bore and a radially outer surface of the metallic inducer portion, wherein a second distance is between the exducer bore and a radially outer surface of the polymeric exducer portion, and wherein the first distance is larger than the second distance.

7. The impeller of claim 1, wherein a first distance is between the inducer bore and a radially outer surface of the metallic inducer portion, wherein a second distance is between the exducer bore and a radially outer surface of the polymeric exducer portion, and wherein the first distance is smaller than the second distance.

8. A rotary machine comprising:
- a compressor section comprising:
  - a compressor housing with a compressor inlet and a compressor outlet;
  - a compressor duct connecting the compressor inlet and the compressor outlet; and
  - a compressor impeller in the compressor duct;
- a first turbine section comprising:
  - a first turbine housing with a first turbine inlet and a first turbine outlet;
  - a first turbine duct connecting the first turbine inlet and the first turbine outlet; and a first turbine impeller in the first turbine duct, the first turbine impeller comprising:

a first metallic inducer portion comprising:

a first inducer hub having an open end;

an inducer bore through the inducer hub;

first inducer blades attached to the first inducer hub;

a first inducer coupling on an end of the inducer hub opposite the open end of the inducer hub; and channels extending through the first inducer blades and the inducer hub, wherein the channels fluidly connect channel inlets in tips of the first inducer blades with the inducer bore; and a first polymeric exducer portion connected to the first metallic inducer portion, the first polymeric exducer portion comprising:

a first exducer hub;

first exducer blades attached to the first exducer hub; and a first exducer coupling on an end of the exducer hub;

wherein the first exducer coupling connects to the first inducer coupling; and wherein a polymer for the first polymeric exducer portion is chosen from the group consisting of para-aramid fiber, aramid fiber, and combinations thereof; and a tie rod connecting the compressor impeller and the first turbine impeller.

9. The rotary machine of claim 8, wherein a metal for the metallic inducer portion is aluminum.

10. The rotary machine of claim 8, wherein the first turbine impeller inducer coupling is threaded, and wherein the first turbine impeller exducer coupling is threaded to mate with the first turbine impeller inducer coupling.

11. The rotary machine of claim 10, wherein the first turbine inducer is brazed and/or adhered to the first turbine exducer coupling.

12. The rotary machine of claim 8, and further comprising:

a first nut on the tie rod holding the first turbine inducer coupling and the first turbine exducer coupling together.

13. The rotary machine of claim 12, wherein the first turbine inducer coupling is brazed and/or adhered to the first turbine exducer coupling.

14. The rotary machine of claim 8, wherein the first turbine impeller further comprises:

an inducer bore through the inducer hub; and an exducer bore through the exducer hub;

wherein the inducer bore and the exducer bore align when the inducer coupling and the exducer coupling connect; and wherein the tie rod runs through the inducer bore and the exducer bore.

15. The rotary machine of claim 8, and further comprising:

a second turbine section comprising:

a second turbine housing with a second turbine inlet and a second turbine outlet;

a second turbine duct connecting the second turbine inlet and the second turbine outlet; and a second turbine impeller in the second turbine duct and connected to the tie rod, the second turbine impeller comprising:

a second metallic inducer portion comprising:

a second inducer hub;

second inducer blades attached to the second inducer hub; and a second inducer coupling at an end of the second inducer hub;

a second polymeric exducer portion connected to the second metallic inducer portion, the second polymeric exducer portion comprising:

a second exducer hub;

second exducer blades attached to the second exducer hub; and a second exducer coupling at an end of the second exducer hub;

wherein the second exducer coupling connects to the second inducer coupling.

16. The rotary machine of claim 15, wherein the second turbine impeller further comprises:

channels extending through the second inducer blades and the inducer hub, wherein the channels fluidly connect channel inlets in tips of the second inducer blades with the inducer bore;

wherein air moves through the openings and the channels to cool bearings in the rotary machine.

17. An impeller for a rotary machine comprising:

a metallic inducer portion comprising:

an inducer hub;

inducer blades attached to the inducer hub openings through tips of the inducer blades;

channels through the inducer blades and the inducer hub, the channels fluidly connecting the openings to bearings of the rotary machine to cool the bearings; and an inducer coupling on an end of the inducer hub; and a polymeric exducer portion connected to the metallic inducer portion, the polymeric exducer portion comprising:

an exducer hub;

exducer blades attached to the exducer hub; and an exducer coupling on an end of the exducer hub;

wherein the exducer coupling connects to the inducer coupling; and wherein a polymer for the polymeric exducer portion is chosen from the group consisting of para-aramid fiber, aramid fiber, and combinations thereof.

* * * * *